June 3, 1958   R. H. FARCHMIN ET AL   2,836,845
TENDON PULLER
Filed Feb. 19, 1954   4 Sheets-Sheet 1

INVENTORS
ROY H. FARCHMIN
ROBERT DONALD PITTS
BY ERVIN F. ZUBER

Flournoy Corey
ATTORNEY.

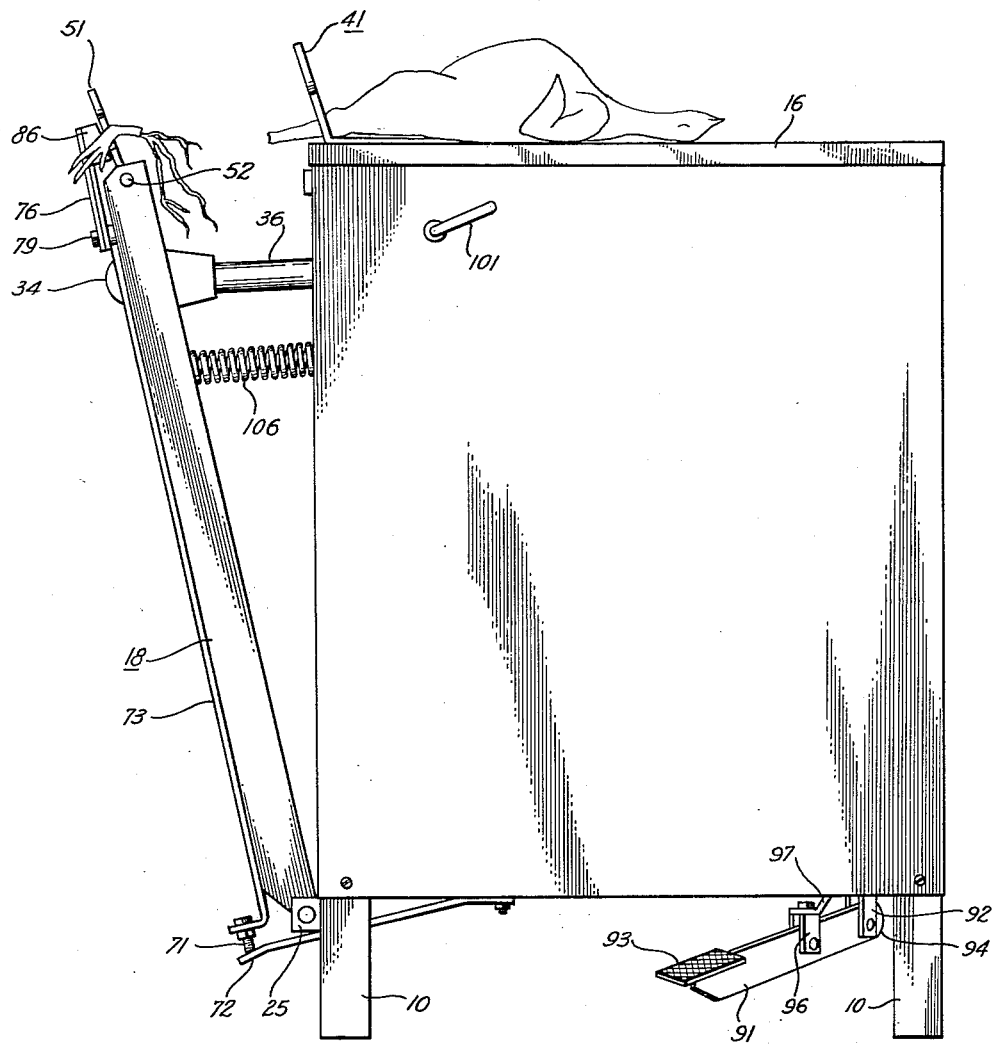

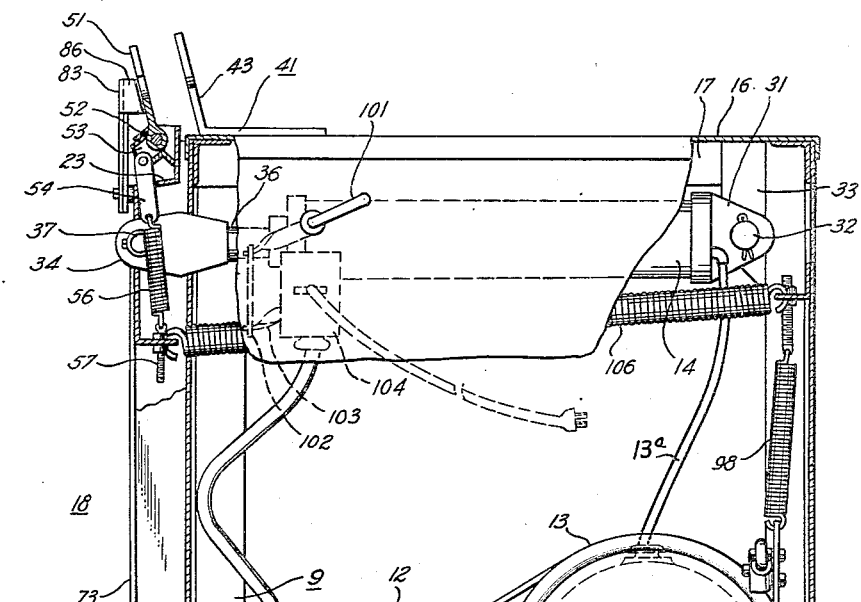
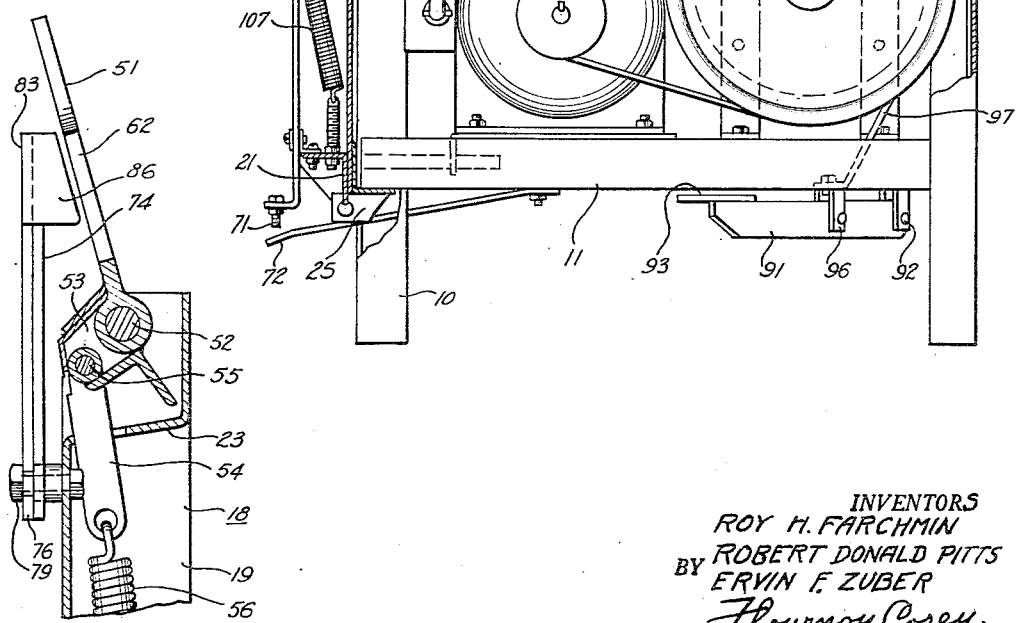

June 3, 1958 R. H. FARCHMIN ET AL 2,836,845
TENDON PULLER
Filed Feb. 19, 1954 4 Sheets-Sheet 4
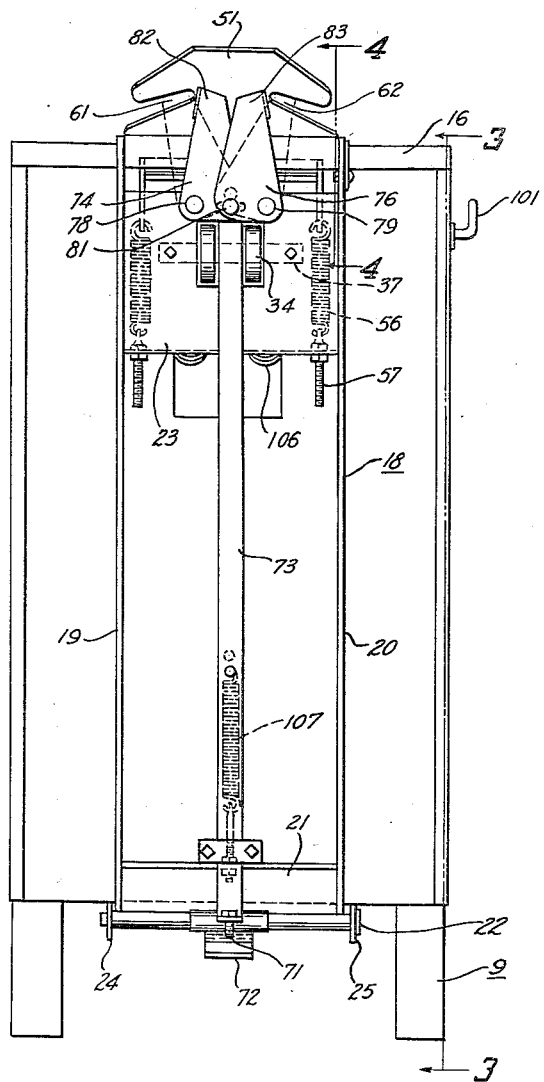
INVENTORS
ROY H. FARCHMIN
ROBERT DONALD PITTS
BY ERVIN F ZUBER
Flournoy Corey.
ATTORNEY.

United States Patent Office 2,836,845
Patented June 3, 1958

2,836,845

TENDON PULLER

Roy H. Farchmin, Robert Donald Pitts, and Ervin F. Zuber, Cedar Rapids, Iowa, assignors to Pickwick Company, Cedar Rapids, Iowa, a corporation of Iowa Application February 19, 1954, Serial No. 411,508

7 Claims. (Cl. 17—11.3)

This invention relates to poultry processing equipment and has particular relation to a mechanized tendon puller for drawing the tendons from the legs of chickens, turkeys, pheasants and the like.

In the dressing of poultry, particularly in the dressing of turkeys, it is necessary, in preparing the bird for the table, at one point or another, to cut off the feet. In performing this operation, it is very desirable that the tendons of the legs be removed at the same time so as to make the meat of the legs more desirable and edible. In the processing of turkeys particularly, this is a very arduous task when done with manual type pullers and, for this reason, this operation is frequently neglected.

A preferred method of removing leg tendons is to break the legs just below the first joint and then pull the tendons out of the meat of the leg by a direct pull on the feet.

This operation requires a double motion; one, a breaking motion as one might do in breaking a twig and secondly, a pulling action, longitudinally, of the bone of the leg.

This operation, particularly the second portion, requires considerable power. The action must be smooth and the stroke must be of sufficient length to completely remove the tendons from the flesh of the leg. In addition, it becomes desirable, in order to complete the operation in the shortest time, to automatically eject the feet from the pulling mechanism immediately after the pulling operation is accomplished.

It is, therefore, among the general objects of the invention, to provide a smoothly acting, powerful and effective machine for the purposes above outlined and in which removal of the tendons is accomplished without breaking and leaving any portions thereof in the legs of the bird.

Another object of the invention is to provide a new and improved means for breaking the legs and withdrawing the tendons of the poultry.

A still further object of the invention is to provide means for ejecting the feet and tendons from the mechanism.

A still further object of the invention is to provide a relatively inexpensive and reliable structure of the above character which will operate with a minimum of servicing and expense.

Other and further features and objects of the invention will be more apparent to those skilled in the art upon a consideration of the accompanying drawings and following specifiications, wherein is disclosed a single exemplary embodiment of the invention, with the understanding, however, that such changes may be made therein as fall within the scope of the appended claims, without departing from the spirit of the invention.

Referring now to the drawings:

Figure 2 is an enlarged view in side elevation of the tendon puller shown in Figure 1, illustrating the means employed for ejecting the feet and tendons after the pulling operation is complete.

Figure 3 is a view in side elevation of the tendon puller shown in Figure 2 as it appears with portions of the cover broken away to display the interior of the machine and with portions of the structure shown in dotted lines.

Figure 4 is an enlarged, fragmentary view in section of a mounting assembly of the movable gripper plate of the device shown in Figures 1 to 3 inclusive, and taken at section line 4—4 of Figure 5.

Figure 5 is a view in rear elevation of the tendon puller illustrated in Figures 2, 3 and 4, section line 4—4 being a portion of the gripper plate.

Figure 1:
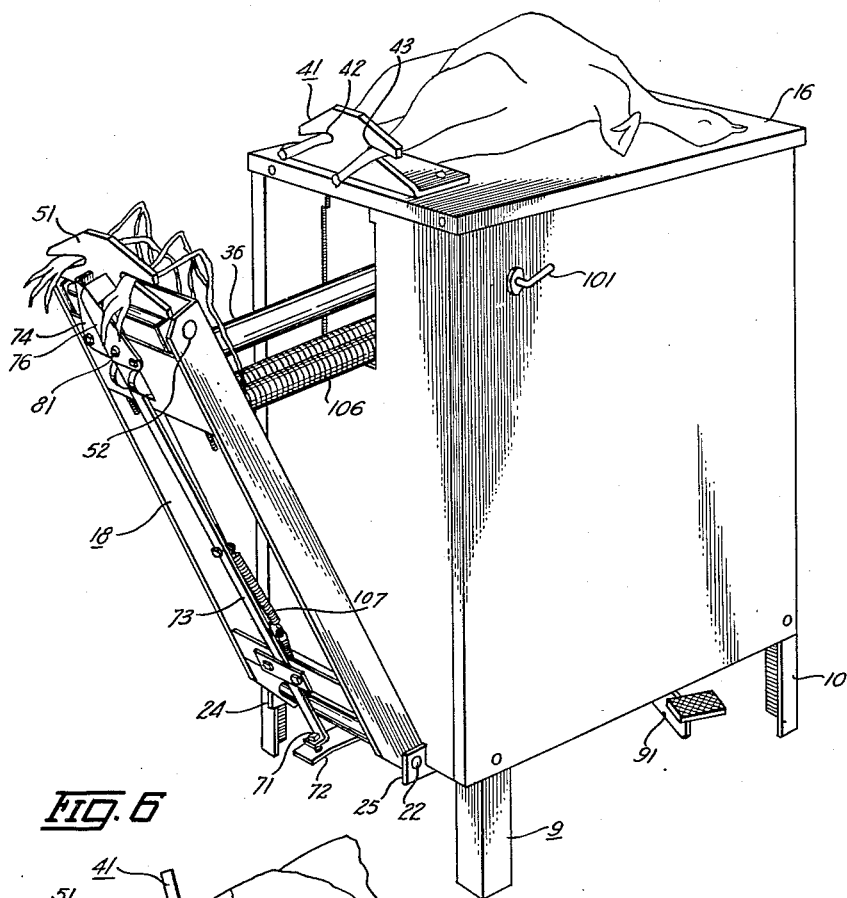
Figure 1 is a view in perspective of one embodiment of the invention illustrating a bird resting on the table of the tendon puller, the feet and tendons of the bird having been withdrawn by the pulling means.

Referring more particularly, for the present, to Figures 1, 2 and 3, a device constructed according to a preferred embodiment of my invention includes a box-like mainframe 9 having four angle iron legs 10 and a rectangular angle iron platform 11 on which a driving motor 12 and a hydraulic pumping unit 13 are mounted.

The support for the table top 16 is provided by means of a rectangular framework including side frame members 17. The framework must be strongly built since the hydraulic jack will exert quite a considerable force on the pulling means. The pulling means includes a rectangular pulling frame 18 having vertical members 19 and 20 and a horizontal frame member 21 at the lower end thereof and a box frame member 23 at the upper end thereof. The pulling frame 18 is pivotally engaged to brackets 24 and 25 on the lower rear edge of the frame 10 by means of a pivot pin 22.

The fixed end 31 of the hydraulic jack 14 is pivotally engaged by means of a stub shaft 32 to a pair of depending frame members 33 and the clevis 34 on the free end of the piston rod 36 of the jack is pivotally engaged to the upper end of the frame 18 by means of a cross shaft 37.

A fixed gripper plate 41 is secured to the upper face of the top 16 and this plate has a pair of oppositely disposed, tapered slots 42 and 43 extending upwardly and inwardly from the lateral edges thereof for engaging the legs of the bird just below the first joint as illustrated in Figure 1. A movable gripper plate 51, slotted at 61 and 62 in substantially the same manner as fixed gripper 41, is pivotally mounted, by means of a pivot shaft 52, in the upper portion of the pulling frame 18 and has a rearwardly extending lever arm 53.

A link 54 is pivotally engaged to the lever arm 53 by means of pivot pin 55. A spring 56 is fixed at one end, as by the adjustable stud bolt 57, to the boxed frame 23, the other end being attached to the free end of the link 54.

Figure 6:
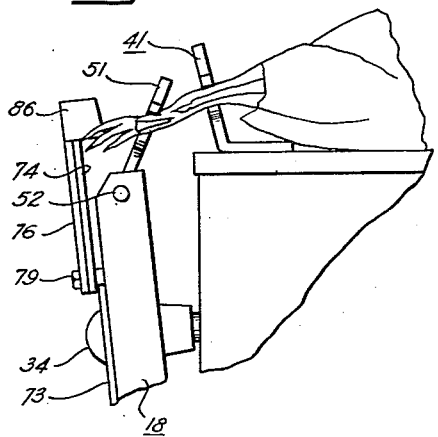
Figure 6 is an enlarged view of the pulling means in operation showing the relative positions of the gripper plate as the leg bone of the fowl is broken, the flesh of the leg being cut away to show the bone.

Normally, the movable gripper plate 51 is substantially parallel to the slotted gripper portion 42 of the fixed gripper plate 41, but it is apparent that if the legs of a turkey or the like are placed in the gripper members as shown in Figure 2 and the movable gripper plate forced away from the fixed gripper plate, the movable gripper 51 will tilt to the position shown in Figure 6. The arc of rotation of the movable gripper plate 51 is in a downward direction which causes the slots of the plate 51 to misalign themselves in relation to the slots 42 and 43 of the fixed plate. This misalignment results in a downward force on the leg bone of the poultry causing the bone to break.

As the pulling frame 18 approaches its rearmost position, a set-screw 71 strikes a stop 72 on the base of the machine and causes upward movement of a strap-like ejector arm 73. A pair of oppositely disposed, triangular levers or ejectors 74 and 76 are pivotally engaged to the boxed frame 23 of the pulling arm by means of studs 78 and 79. When the ejector arm 73 moves upwardly, a pin 81 at the upper end thereof is engaged with and causes upward movement of adjacent corners of the ejectors 74 and 76 and, since the outer corners of these members are pivotally engaged to the pulling frame 18, the upper ends 82 and 83 of the ejectors are caused to move outwardly away from each other. These upper ends 82 and 83 are provided with pusher flanges shown at 74 and 76 of Figure 1 and these pusher flanges will move outwardly against the feet of the bird, driving the feet and tendons out of the slots of the movable gripper plate.

To provide control means, a foot treadle 91 is pivotally engaged to the underside of the frame by means of a clevis 92 and this treadle has a pedal 93 at the outer end thereof. The treadle arm is pivotally engaged to clevis 96 which is operatively engaged to the valve control arm of the pump by means of a treadle link 97. A spring 98 normally holds the control valve arm in a position such that fluid is free to return from the jack 14 to the reservoir.

Power is provided by the motor 12 which is energized from outside the machine by means of the switch lever 101 which is attached inside the machine by link 102 to the operating lever 103 of switch 104.

In operation, the motor is energized by turning on the switch 104 and as soon as the motor starts running, oil is pumped through a by-pass within the pump in accordance with the usual practice. As soon as the pedal 93 is depressed and kept in that position, the hydraulic fluid is directed from the pump 13 through hose 13a into the hydraulic jack 14 to drive the piston rod 36 outwardly and thus move the pulling frame 18 outwardly for the leg breaking and tendon pulling operation previously described.

As the pulling frame 18 reaches the end of its stroke, the feet of the bird are ejected from the slots of the movable gripper plate 51. The operator then releases the pressure on the pedal 93. A plurality of coil springs 106 are provided to then retract the pulling frame 18 to drive the oil within the hydraulic jack back into the reservoir of the pump. As the pulling arm 18 is returned to its initial position, the ejectors 74 and 76 are also returned to their initial position by means of a coil spring 107 which is affixed between the push rod 73 and the lower portion 21 of the pulling frame 18.

The device herein described is one of the embodiments of my invention, has a powerful pulling effect and is effective to not only break the legs of the bird, but also pull the tendons. The feet and tendons are ejected at the end of the stroke and the operator permits the pulling member to return to its original position, ready for pulling the tendons of another bird.

The device is simple and effective and rapid in operation and inexpensive to maintain and repair.

Although I have described a specific embodiment of my invention, it is apparent that modifications thereof may be made by those skilled in the art. Such modifications may be made without departing from the spirit and scope of my invention as set forth in the appended claims.

We claim as our invention:

1. In a tendon puller having a main frame and a table for supporting a fowl during the pulling operation, a pulling frame pivotally engaged at one end to the main frame and means operatively positioned between the main frame and the pulling frame for causing the pulling frame to be forced away from the main frame in an arcuate movement, a fixed plate on the main frame having a notch for gripping a leg of the fowl and a second gripping plate having a notch for also engaging the leg of the fowl at a spaced distance from the first engagement, the second gripping plate being pivotally engaged to the pulling frame on an axis transverse to the line of movement of the pulling frame whereby the movement of said pulling frame away from the main frame will cause the second gripping plate to tilt to first break the leg and on continued movement to pull the tendons.

2. A tendon puller as in claim 1, having a leg and tendon ejecting means comprising a push arm movable vertically of the pulling frame, an ejector plate rotated outwardly by the push arm across the notch of the movable gripper plate, and a stop in the path of movement of the push arm for causing upward movement of the push arm as the pulling frame moves outwardly from the main frame.

3. In a tendon pulling device, the combination of gripper plates adapted to receive the leg of a fowl therein, a support for one of the gripper plates, means mounting said support for pivotal arcuate movement relative to the other gripper plate, and means mounting said one of the gripper plates on the support for opposite pivotal movement relative thereto.

4. In a tendon pulling device, the combination of a fixed gripper plate, a movable gripper plate spaced from the fixed gripper plate cooperating therewith for holding a leg of a fowl therein, a support for the movable gripper plate, means mounting the support for pivotal arcuate movement relative to the fixed gripper plate, and means for mounting the movable gripper plate on the support for opposite pivotal movement relative thereto.

5. In a tendon pulling device, the combination of a fixed gripper plate, a movable gripper plate spaced from the fixed gripper plate and cooperating therewith for holding a leg of a fowl therein, a support for the movable gripper plate, means mounting the support for pivotal movement relative to the fixed gripper plate, said support having a shaft mounted therein and supporting said movable gripper plate thereon for opposite pivotal movement relative thereto.

6. In a tendon pulling device, the combination of a fixed gripper plate, a movable gripper plate spaced from the fixed gripper plate and cooperating therewith for holding the legs of a fowl therein, a support for the movable gripper plate, means mounting the support for pivotal movement relative to the fixed gripper plate, means mounting the movable gripper plate on the support for opposite pivotal movement relative thereto, and fluid operative power means connected with the support for operating the movable gripper plate.

7. In a tendon pulling device, the combination of a fixed gripper plate, a movable gripper plate adjacent the fixed gripper plate, said fixed and movable gripper plates having parallel inwardly extending slotted openings therethrough in position for receiving the legs of a fowl therein and extending axially of said openings, and means mounting the movable gripper plate for arcuate movement thereof relative to the fixed gripper plate in a direction axially of said openings for separating and removing portions of the legs from each other.

References Cited in the file of this patent
UNITED STATES PATENTS

| | | |
|---|---|---|
| 2,310,891 | Branick | Feb. 9, 1943 |
| 2,382,320 | Jenson | Aug. 14, 1945 |
| 2,653,346 | Ograbisz | Sept. 29, 1953 |
| 2,669,748 | Ine | Feb. 23, 1954 |
| 2,689,371 | MacDonald | Sept. 21, 1954 |
| 2,694,219 | Mayer | Nov. 16, 1954 |
| 2,739,346 | Martin et al. | Mar. 27, 1956 |